United States Patent Office
3,236,750
Patented Feb. 22, 1966

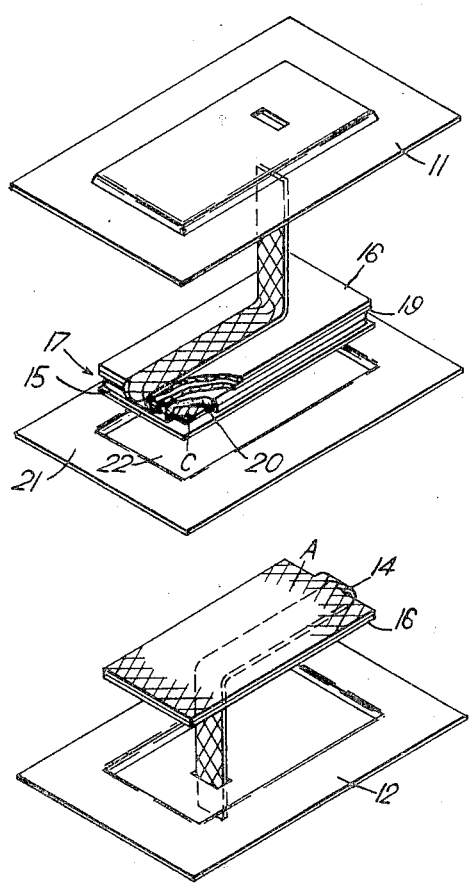
HERBERT D. HUGHES
RICHARD W. LEWIS
ALAN H. PARTRIDGE

3,236,750
ELECTRODEPOSITION METHOD OF PRODUCING AN ACTIVE ANODE
Herbert Denis Hughes, East Grinstead, Sussex, and Richard W. Lewis and Alan H. Partridge, Horsham, Sussex, England, assignors to Metachemical Processes Limited
Filed July 15, 1964, Ser. No. 382,779
2 Claims. (Cl. 204—24)

The present invention relates to improvements in electric primary cells, and to batteries comprising a plurality of such cells and is a continuation-in-part of co-pending applications Serial Nos. 115,370, now abandoned, filed June 7, 1961, and 187,423 filed April 13, 1962.

U.S. Patent No. 3,026,365 issued March 10, 1962, claims an electric primary cell comprising a hermetically sealed outer casing, a cathode and an anode accommodated within said outer casing, said anode and said cathode each including a support surface formed of expanded metal and each having an integral extension connection member also formed of the same expanded metal leading to the outside of said casing in sealed relation thereto, an active covering on said anode including a foil selected from a material containing a range of 90 to 99% indium and 10 to 1% bismuth, both metals being of high purity and containing not more than 0.1% total of impurities and an alkaline solution electrolyte within said outer casing. Said patent further refers to the use of a perforated nickel sheet for the anode and cathode supports, and in the case of the anode support a layer of indium or indium alloy can be applied by a plating process.

The specific object of the present invention is to provide an improved anode structure the active surface of which consists of indium and bismuth and which active surface is produced otherwise than by forming an alloy of indium and bismuth.

A more general object is to provide an improved primary cell which has long-term stability, that is to say, it can be stored for lengthy periods without any substantial deterioration in the properties of the cell and without danger of loss or leakage of electrolyte.

Various systems of electrodes and electrolytes have been proposed for primary cells but the systems and constructions previously known are liable to produce gas during storage or on discharge and, therefore, it has been necessary to provide a vent of some sort to permit such gas to be evacuated from the cell proper. The provision of such vents necessarily also permits the entry of air to the inside of the cell, which tends to accelerate undesired chemical reactions, and these conditions do not provide the requirements for high stability and storage over long periods.

The present invention is directed particularly to an improved form of electrode structure which is designed for operation without gas evolution on storage or on discharge and can thus be utilised in hermetically sealed cells.

A more specific object of the present invention is to provide an improved method of producing an anode for use in a cell of the character described in said specification, said anode consisting of a support member and an active covering incorporating indium with a surface including bismuth.

In accordance with the present invention an anode structure for use in a cell of the character specified comprises an openwork conductive support, an active coating thereon consisting of indium and superficially incorporated bismuth.

Both the indium and the bismuth may be applied by deposition methods; then it becomes possible to use a range of materials for the supports; thus for example it is possible to use nickel, silver, copper, or stainless steel as the anode support, and this support may, moreover, be corrugated or crimped to increase the surface area which can be made available for a given overall size.

In the production of an anode structure according to the present invention the support may be coated with indium by an electroplating procedure and then bismuth can be deposited on the plated indium by chemical deposition or by electro-deposition.

One construction of an electric primary cell incorporating electrode structures according to the present invention is shown by way of example on the accompanying drawings, the components of a hermetically sealed cell being shown separated, as if prior to assembly and sealing of the cell.

As shown on the drawings, the cell comprises top and bottom casing sections 11, 12, which may consist of pressed thermoplastic sheet consisting for example of polyvinyl chloride or other suitable alkali-resistant material. Each casing section is formed with a comparatively shallow depression and with an outwardly directed flange.

An anode A and a cathode C each consist of a support consisting of expanded or perforated metal sheet, such as defined above, and each support consists of a portion adapted to fit within the dished part of the casing sections 11 and 12, and a projecting pigtail which is folded back so as to extend along the base of the dished part of the casing section 11 or 12 and to pass outwardly through an aperture near the centre thereof, the projcting part being shown at 14 in the case of the anode and at 15 in the case of the cathode. The part of the projecting pigtail running along the base of the casing section 11 or 12 is covered by means of a strip of thermoplastic material 16 which is welded to the inside of the casing section so as to seal off the aperture in the casing section. The cathode may be formed of any of the metals specified other than copper.

The anode support A is coated by a plating procedure with a major proportion of pure indium and thereafter bismuth is caused to become superficially associated with the indium, both metals being of high purity, and in each case the total of impurities should not exceed 0.1%. The product is of openwork structure the indium coating the link bar portions between the openings to give a large indium surface.

The bismuth is coated superficially on the indium following the production of an indium coating on the support, by a deposition process from a bismuth salt solution. Such deposition can be carried out by reduction plating procedures or alternatively by electro-deposition. Whatever process is adopted the plating operations may be repeated several times to produce a sufficient deposit of bismuth. If desired after deposition of bismuth has been effected a further layer of indium may be applied, followed by a further deposition of bismuth and these operations may be repeated several times to build up the required thickness of deposit which may be of the order of .005 to .01".

The various methods of producing a bismuth coating will result in an extremely thin coating of metallic bismuth on the surface of the indium. If desired the anode is subjected to a heat treatment which results in a firm binding of the bismuth metal into the superficial layer of the indium and such a heat treatment may be effected over the range from 50° C. to 150° C., but such a heat treatment is optional and make substantially no difference to the operational characteristics of the anode.

The small proportion of bismuth so included, and which may amount to .01% to 1% by weight reckoned on the indium provides improved results in that it prevents polarisation of the anode and thus improves the current output of the cell.

In one method of carrying the invention into effect the expanded metal support is first plated electrolytically with pure indium. A suitable plating bath for this purpose contains an indium salt and may for example be compounded as follows:

| | Gm. per litre |
|---|---|
| Indium sulphate | 45 |
| Sodium sulphate | 10 |

The current density during plating should not exceed 5–10 amps per square foot of surface and the coating thickness is of the order of .008". The amount of indium deposited amounts to between 1.8 and 2 gms. for each 1 ampere hour capacity of the cell.

The indium-plated metal support is then immersed in an aqueous solution of a bismuth salt. For instance the plated electrode may be immersed for 5 secs. in a solution of bismuth chloride containing 5 gms. per litre of bismuth. The electrode is then washed and dried at 50° C. An electrode produced in this way contains a bismuth percentage of 0.2 to 0.5% for an electrode of 1 ampere hour capacity.

In accordance with another method of carrying the invention into effect an expanded metal support is plated electrolytically with pure indium as explained above and is thereafter plated electrolytically with pure bismuth. For this purpose the indium plated anode support is inserted in a bismuth plating bath which is compounded as follows:

| | |
|---|---|
| Bismuth oxycarbonate | 125 grams per litre. |
| Ammonia | 150 mls. per litre. |
| Ethylene diamine tetra-acetic acid | 185 grams per litre. |
| Ethylene diamine | 110 mls. per litre. |

The current density during plating is 12 to 15 amps per square foot of surface.

The various operations for producing coatings of indium and bismuth may be repeated several times. After treatment in the bismuth plating solution the electrode may be washed and then returned to the indium plating bath to apply a further coating of indium, which may then be followed by bismuth deposition and so on, and these various operations may be performed without intermediate drying of the electrode. When a deposit of sufficient thickness has been attained the electrode may be washed and dried at a temperature ranging between 50° and 150° C.

The casing section 11 serves to accommodate the cathode assembly indicated generally at 17. This assembly comprises the perforated or expanded metal support and a mass or pellet of depolariser 18 consisting of the following mixture (by weight parts):

| | |
|---|---|
| Mercuric oxide | 92 |
| Graphite | 4 |
| Carbon black | 4 |

The mercuric oxide may be replaced by other oxidising agents such as manganese peroxide. It may be formed into a stiff paste with distilled water and then applied as a pellet on the metal support. It may be about 1.25 mm. thick and proportioned so that 4 gm. is available for each 1 ampere hour capacity. The cathode and the pellet are laid upon a sheet of this polythene 19 treated at least at its edges to render it adhesive and a sheet of fibre fabrics 20 is laid over the pellet, the edges being brought into contact with the edges of the polythene sheet and held in contact therewith by the adhesive property thereof. The fibre fabric referred to is a commercial product which consists of rayon fibres bonded with viscose and is a paper-like material. It may if desired be replaced by an alkali resistant paper such as a suitable grade of filter paper. The cathode assembly so formed is placed in or formed into the upper casing section 11 and the two sections 11 and 12 supporting the cathode assembly 17 and the anode A can then be assembled with the interposition of a gasket or filler 21 consisting of a piece of highly plasticised polyvinyl chloride having a square window aperture therein into which a membrane 22 consisting of alkali-resistant material, such as a suitable grade of filter paper or porous polyvinyl chloride has been attached, for example by plastic welding processes. This material 22 has the purpose of preventing migration of mercury (or other reduced metal) from the depolariser mass towards the anode.

It will, of course, be understood that the finished cell is very compact since the cathode assembly 17 is pressed into the casing section 11 during the assembly operations. The next stage is the application of heat and pressure to the superposed flanges of the two casing sections 11 and 12, to form a fluid-tight and hermetically sealed assembly, migration of the plasticiser from the membrane 21 permitting the flanges to be satisfactorily welded together. This may be performed by high frequency welding techniques.

In order to permit filling with electrolyte, it is preferred to adopt a vacuum filling technique, and for this purpose in the course of assembly of the cell a duct is formed in the superposed flanges, for example by placing a piece of wire between the flanges when they are being sealed under heat and pressure, the wire being later withdrawn. If the cell is then treated in a vacuum chamber, immersed in electrolyte, and the surrounding pressure restored to the normal value, the cell will become substantially filled with the electrolyte, after which the duct can be sealed off by a further application of pressure. Finally, the superposed flanges are trimmed off leaving the anode and cathode pigtails 14, 15 projecting externally of the cell.

An electrode system of this character and using such an indium-bismuth electrode with an aqueous solution of potassium hydroxide as the electrolyte, has an E.M.F. of about 1.16 volts and, moreover, has the advantage of long-term stability, i.e. it provides a battery which can be stored for lengthy periods without danger of deterioration during storage and which is ready for immediate use whenever required.

What we claim is:

1. A method of producing an active anode for a hermetically sealed primary cell, comprising the steps of electro-depositing a coating of indium upon a conductive support having spaced web parts to define an openwork structure and inserting said electro-deposited indium support in a bismuth plating bath, electro-depositing bismuth on said indium electro-deposit.

2. The method as claimed in claim 1, comprising the further steps of electro-depositing a second coating of indium and thereafter electro-depositing bismuth on said second indium electro-deposit.

References Cited by the Examiner

UNITED STATES PATENTS

| 2,551,413 | 5/1951 | Booe | 204—43 X |
| 2,683,184 | 7/1954 | Boswell | 136—107 |
| 2,708,683 | 5/1955 | Eisen | 136—120 X |
| 2,862,039 | 11/1958 | Ensign et al. | 136—135 |
| 2,873,214 | 2/1959 | Schnable | 117—130 |
| 2,959,631 | 11/1960 | Boswell | 136—83 |

OTHER REFERENCES

Hodgman et al.: Handbook of Chemistry and Physics, 35th Edition, 1953, page 1651.

WINSTON A. DOUGLAS, *Primary Examiner.*

JOHN H. MACK, *Examiner.*